United States Patent
Eder et al.

(10) Patent No.: US 6,867,906 B2
(45) Date of Patent: Mar. 15, 2005

(54) MULTIPLEXER FOR PROVIDING NON-EQUIDISTANT INTERVALS BETWEEN PUMP WAVELENGTHS IN BROADBAND RAMAN AMPLIFIERS

(75) Inventors: Christian Eder, Munich (DE); Guido Gentner, Munich (DE); Richard Neuhauser, Neufahrn (DE); Ulrich Gaubatz, Karlsfeld (DE); Peter Krummrich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/096,638

(22) Filed: Mar. 12, 2002

(65) Prior Publication Data

US 2002/0181834 A1 Dec. 5, 2002

(30) Foreign Application Priority Data

Mar. 13, 2001 (DE) .......................................... 101 11 969

(51) Int. Cl.[7] ................................................ H01S 3/00
(52) U.S. Cl. ..................................................... 359/334
(58) Field of Search ........................ 359/334; 372/38.06

(56) References Cited

U.S. PATENT DOCUMENTS

| | | | | |
|---|---|---|---|---|
| 5,907,429 A | * | 5/1999 | Sugata .................. | 359/341.42 |
| 6,292,288 B1 | * | 9/2001 | Akasaka et al. ............. | 359/334 |
| 6,424,455 B1 | * | 7/2002 | Dmitri ......................... | 359/334 |
| 6,583,926 B1 | * | 6/2003 | Wu et al. ................. | 359/341.4 |
| 6,597,495 B2 | * | 7/2003 | Gertsvolf et al. ......... | 359/341.3 |
| 2002/0145793 A1 | * | 10/2002 | Bock et al. .................. | 359/334 |

FOREIGN PATENT DOCUMENTS

JP 11126936 A * 5/1999 ............. H01S/3/10

OTHER PUBLICATIONS

Kidorf et al. Pump Interactions in a 100–nm Bandwidth Raman Amplifier. IEEE Photonics Technology Letters, vol. 11, No. 5, May 1999. pp. 530–532.*

* cited by examiner

*Primary Examiner*—Thomas H. Tarcza
*Assistant Examiner*—Deandra M. Hughes
(74) *Attorney, Agent, or Firm*—Bell Boyd & Lloyd LLC

(57) ABSTRACT

A method for producing non-equidistant pump waves for Raman amplification of a signal which is passed via an optical waveguide, as well as a pump wave producing apparatus for producing pump waves for Raman amplification of a signal which is passed via an optical waveguide, which apparatus has at least one pump source and is set up such that it can produce pump waves at a first, a second, a third and a fourth mutually equidistant pump wavelength, having a control device which is set up such that it causes, in each case, the production of a pump wave u, v, w at the first, second and fourth pump wavelengths, with the control device being set up such that no pump wave is produced at the third pump wavelength, so that a non-equidistant pump channel pattern is achieved overall.

9 Claims, 3 Drawing Sheets

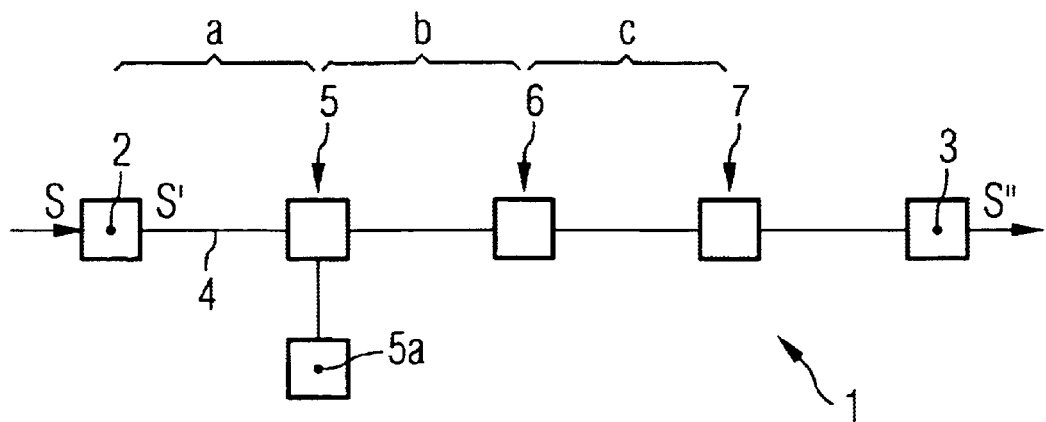
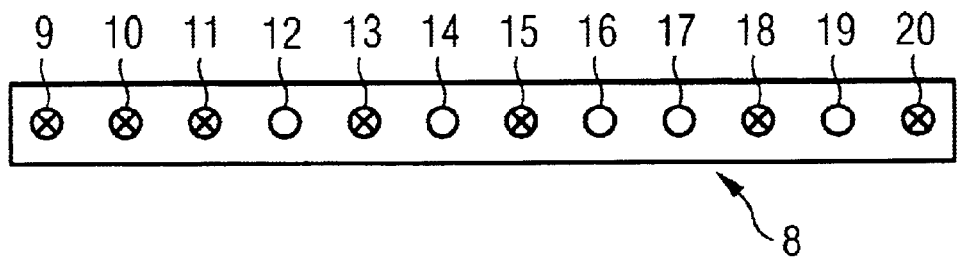
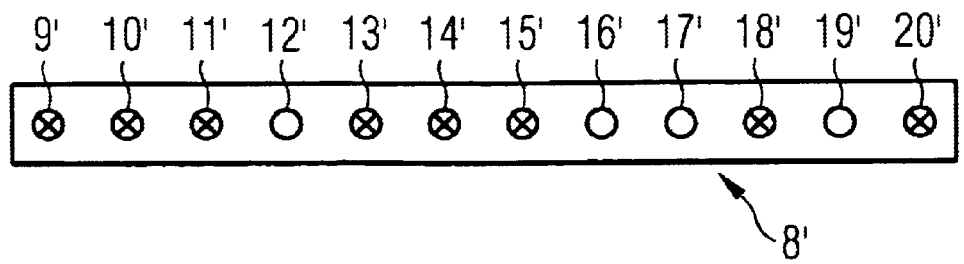

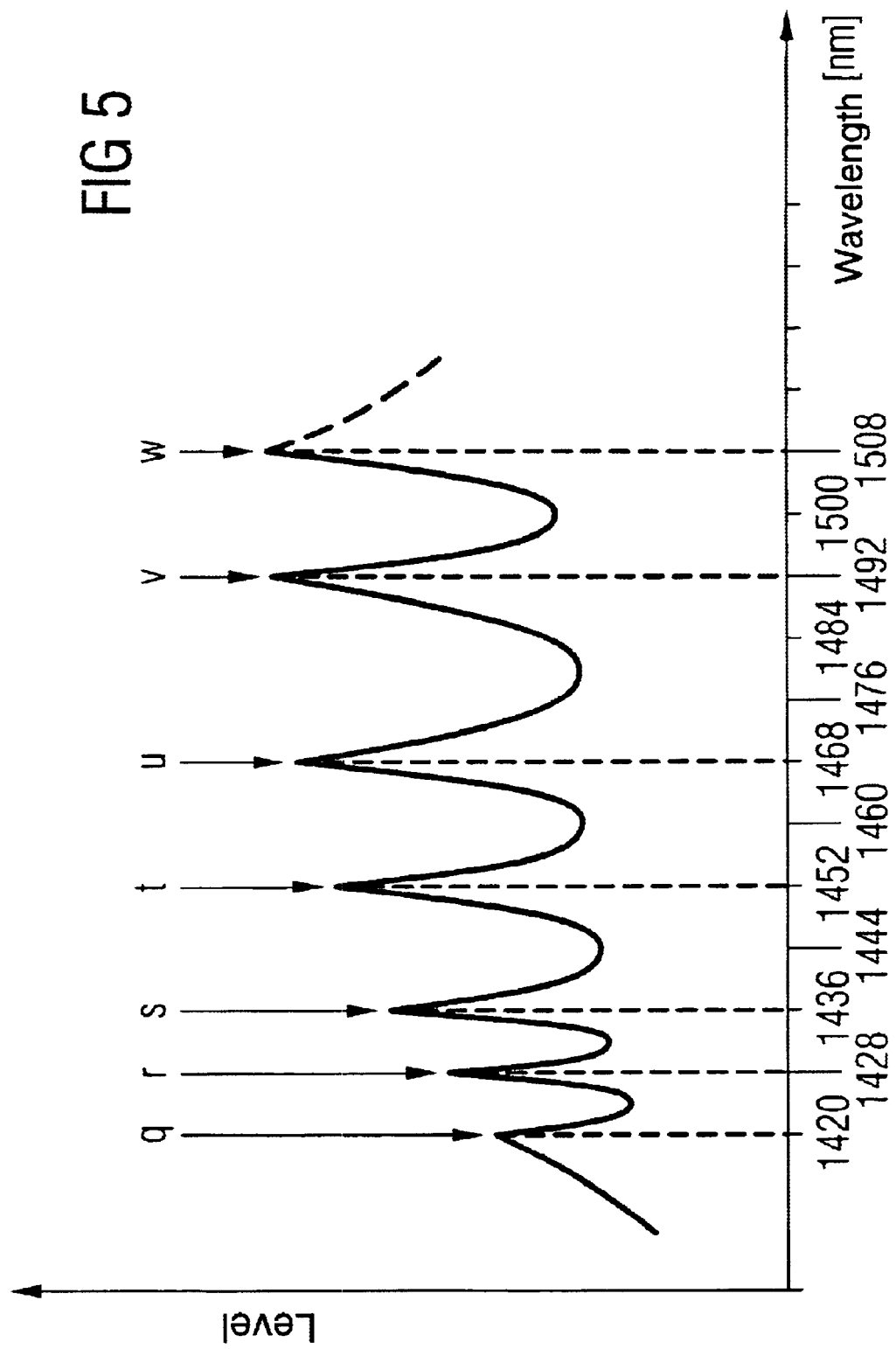

MULTIPLEXER FOR PROVIDING NON-EQUIDISTANT INTERVALS BETWEEN PUMP WAVELENGTHS IN BROADBAND RAMAN AMPLIFIERS

BACKGROUND OF THE INVENTION

The present invention relates to a method for producing pump waves for Raman amplification of a signal which is passed via an optical waveguide as well as to a pump wave producing apparatus.

When an optical WDM signal ("WDM"=wavelength division multiplex) is transmitted via an optical waveguide, the attenuating characteristics of the optical waveguide lead to the signal becoming weaker. The transmitted signal therefore must be amplified after specific optical waveguide sections.

One option for signal amplification is based on the use of stimulated Raman scatter. In this case, a pump signal is fed into the optical waveguide. The pump signal is produced via a number of pump sources; for example, a number of laser diodes. In this case, the group of wavelengths from the pump sources is chosen such that, taking account of the Raman gain spectrum, all the channels in the WDM signal are amplified to the same extent (see "Fiber Optic Communication Systems", G. P Agrawal, 2nd Edition, page 381, FIG. 8.11). By way of example, one channel is maximized at a frequency difference of 13.2 THz with respect to a pump frequency, and is amplified to a lesser extent if the frequency difference is greater or smaller. Relatively homogenous amplification of the channels in a WDM transmission signal can be achieved by using a greater number of different pump wavelengths.

Periodic filters, for example Mach-Zehnder interferometers, can be used for multiplexing the various pump wavelengths. Using Mach-Zehnder interferometers, it is possible to multiplex together pump signals with a relatively high total power, for example up to 2 W, and inject these pump signals into the optical waveguide. However, in the case of the methods which are known from the prior art using conventional Mach-Zehnder interferometers, only pump wavelength patterns with mutually equidistant pump wavelengths can be produced (see, for example, the publication "Namiki et al., Proc. OAA 2000, Quebec, OMB 2, 7–9").

When using equidistant pump wavelengths the so-called four-wave mixing effect ("FWM") occurs between the pump waves; particularly with fiber types with little dispersion at the pump wavelengths that are used. The four wave mixing results in the production of new frequency components, so-called mixed products, at sums or differences of pump frequencies. These are superimposed in or outside the spectrum of the pump radiation.

If the longer pump wavelengths are close to the shorter WDM signal wavelengths, the mixed products can be superimposed on the channels in the WDM signal spectrum. FIG. 1 shows an example of a signal spectrum which can occur when using 8 pump waves with equidistant pump wavelength separations. As is shown in FIG. 1, the resultant four wave mixed products FWM lie in the wavelength range of a WDM signal (in this case 1525–1605 nm).

The four wave mixing that occurs in this case results in a deterioration in the optical signal-to-noise ratio OSNR and, hence, in the signal quality on specific channels in the WDM signal. OSNR differences of approximately 8 dB can occur as a result of superimposition of mixed products in the signal spectrum.

The described effect occurs particularly severely in the case of broadband Raman amplification in C band and L band (between approximately 1525 nm and 1610 nm), since the pump wavelengths must extend virtually to the C band for amplification in L band. This results in relatively strong mixed products being produced in C band, which are superimposed on the signal spectrum. The effect is particularly pronounced in this case for fibers whose dispersion zero is close to the wavelength of the pumps with a long wavelength (approximately 1500 nm).

"Agrawal, Nonlinear Fiber Optics, 1995, p. 404" has described the physical effects which lead to four wave mixing. In principle, a distinction can be drawn between degenerate and non-degenerate four wave mixing. Non-degenerate four wave mixing is based on the interaction of photons at three different wavelengths, with photons being produced at a fourth wavelength. In contrast, in the case of degenerate four wave mixing, one wavelength is essentially included twice in the mixing process, so that degenerate four wave mixing can be produced just by photons at two different wavelengths.

It has been proposed that so-called interference filters be used instead of Mach-Zehnder interferometers for multiplexing of pump waves (see, for example, the abovementioned publication "Namaki et al., Proc. OAA 2000, Quebec, OMB 2, 7–9"). These interference filters make it possible to achieve non-equidistant intervals between the pump wavelengths. The publication "Kidorf et al., IEEE Phot. Technol. Lett., 11 (1999), 530–532" describes a non-equidistant pump wavelength distribution in which relatively more pump waves at a different wavelength are provided at shorter pump wavelengths, and relatively fewer pump waves at a different wavelength are provided at longer pump wavelengths. This makes it possible to compensate for a power transfer from short to longer wavelengths along the optical waveguide and to reduce the occurrence of four wave mixed products. However, the power which can be injected into the optical waveguide via interference filters is relatively small.

An object of the present invention is to provide a novel method for producing pump waves, and a novel pump wave producing apparatus.

SUMMARY OF THE INVENTION

This and further aims are achieved by the present invention through a method for producing pump waves for Raman amplification of a signal which is passed via an optical waveguide. The method includes the following steps:

provision of a pump wave producing apparatus having at least one pump source which is set up such that it can produce pump waves at a first, a second, a third and a fourth mutually equidistant pump wavelength;

driving of the pump wave producing apparatus such that a pump wave is produced in each case at the first, second and fourth pump wavelengths, and in that no pump wave is produced at the third pump wavelength, so that a non-equidistant pump channel pattern is achieved overall.

According to an embodiment of the present invention, the pump wave producing apparatus is a Mach-Zehnder interferometer which has more inputs than the number of pump channels to be multiplexed (for example, a Mach-Zehnder interferometer with 12 inputs for 7 or 8 pump wavelengths). A non-equidistant pump channel pattern then can be achieved by choosing the unused inputs such that they are distributed in a correspondingly irregular manner. This reduces the influence of four wave mixing and, hence, increases the optical signal-to-noise ratio OSNR. At the same time, the use of a Mach-Zehnder interferometer makes it possible to inject relatively high pump powers into the optical waveguide.

It is particularly advantageous to use a non-equidistant pump channel pattern for pump waves at relatively long wavelengths, and to use an equidistant pump channel pattern for pump waves at shorter wavelengths. This is because higher local dispersion at relatively short pump wavelengths rapidly leads to divergence of the phase relationships and, hence, to reduced four wave mixing.

With regard to the apparatus, the present invention achieves the abovementioned aims and further aims in that a pump wave producing apparatus is provided for producing pump waves for Raman amplification of a signal which is passed via an optical waveguide, which apparatus has at least one pump source and is set up such that it can produce pump waves at a first, a second, a third and a fourth mutually equidistant pump wavelength, having a control device which is set up such that, in each case, it causes the production of a pump wave at the first, second and fourth pump wavelengths. The control device is set up such that no pump wave is produced at the third pump wavelength, so that a non-equidistant pump channel pattern is achieved overall.

Additional features and advantages of the present invention are described in, and will be apparent from, the following Detailed Description of the Invention and the Figures.

BRIEF DESCRIPTION OF THE FIGURES

FIG. 2 shows a schematic illustration of an optical message transmission path.

FIG. 3 shows a schematic illustration of the use of the inputs of a Mach-Zehnder interferometer according to a first exemplary embodiment of the present invention.

FIG. 4 shows a schematic illustration of the use of the inputs of a Mach-Zehnder interferometer according to a second exemplary embodiment of the present invention.

FIG. 5 shows non-equidistant pump waves, which are produced by the Mach-Zehnder interferometer shown in FIG. 3.

DETAILED DESCRIPTION OF THE INVENTION

Figure 1:
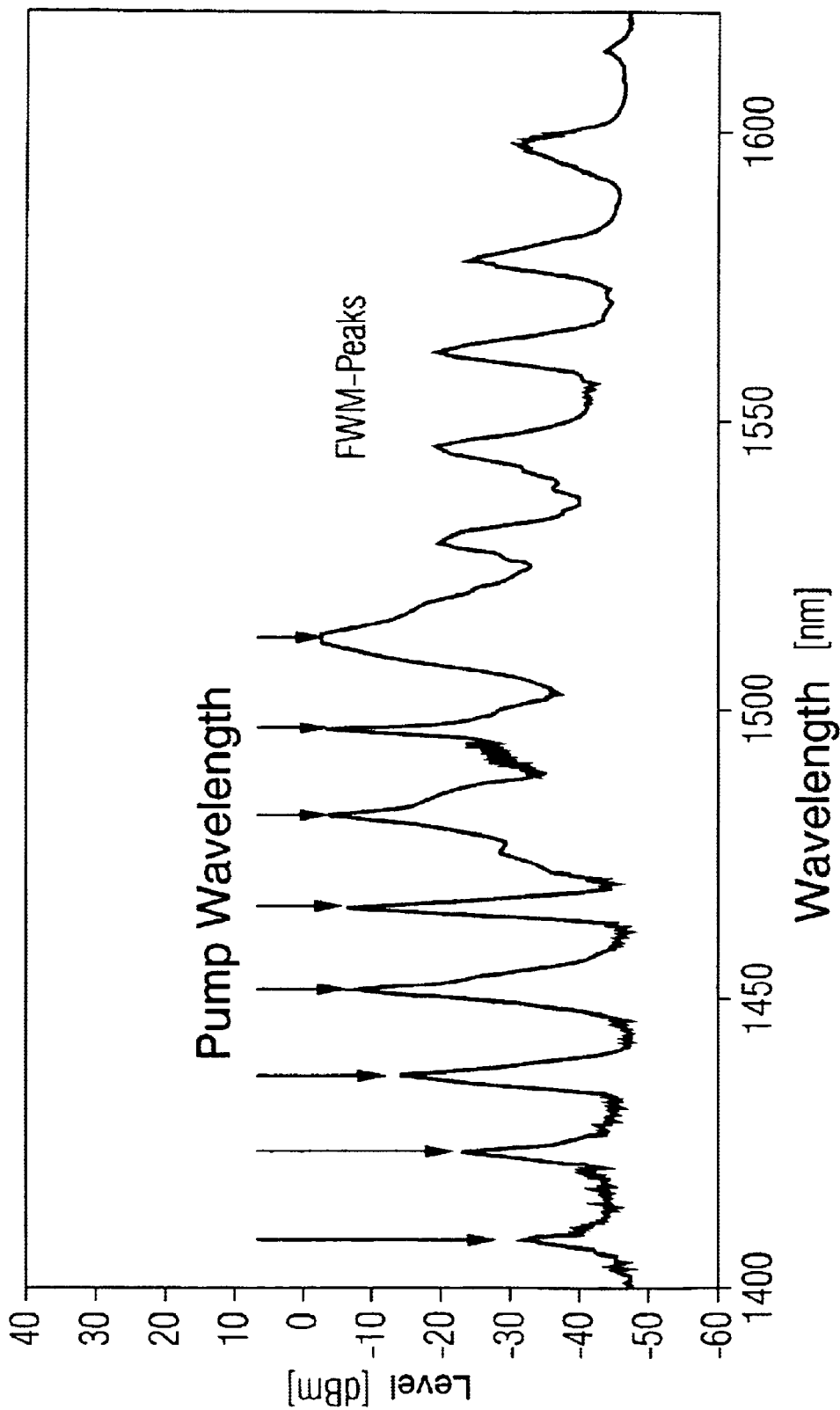
FIG. 1 shows a signal spectrum when using pump waves with equidistant pump wavelength intervals.

FIG. 2 shows a schematic illustration of an optical message transmission path 1 which has a transmitting device 2, a receiving device 3, an optical waveguide 4, and a number of amplification devices 5, 6, 7.

A received electrical signal S' is converted to an optical WDM signal S' in the transmitting device 2 via laser diodes ("WDM"=Wavelength Division Multiplex). The WDM signal S' is injected into the optical waveguide 4 and is transmitted to the receiving device 3, where it is converted back to an electrical signal S' via semiconductor diodes.

Owing to the attenuating characteristics of the optical waveguide 4, the WDM signal S' is weakened in the course of transmission from the transmitting device 2 to the receiving device 3. The WDM signal S' is therefore amplified, on the basis of stimulated Raman scatter, after a first optical waveguide section a by the amplification device 5, and after further optical waveguide sections b, c by the amplification devices 6, 7.

To this end, each amplification device 5, 6, 7 has a Mach-Zehnder interferometer 8. Each Mach-Zehnder interferometer 8 feeds pump waves at a number of different pump wavelengths (for example seven) into the optical waveguide 4. The pump waves are produced via pump sources, in this case using laser diodes. For each amplification device 5, 6, 7, the group of wavelengths of the pump sources is chosen such that, taking account of the Raman gain spectrum, all the channels of the WDM signal S' are amplified relatively homogeneously.

As is shown in FIG. 3, the Mach-Zehnder interferometer 8 has a total of 12 inputs 9, 10, 11, 12, 13, 14, 15, 16, 17, 18, 19, 20, so that pump waves at twelve different pump wavelengths can be produced by applying appropriate control signals to the interferometer inputs 9, 10, 11, 12, 13, 14, 15, 16, 17, 18, 19, 20.

By way of example, when an appropriate control signal is applied to the first interferometer input 9, the interferometer 8 produces a pump wave at a wavelength of 1420 nm. In a corresponding way, a pump wave can be produced at a wavelength of 1428 nm by applying a control signal to the second input 10, and a pump wave at a wavelength of 1436 nm can be produced by applying a control signal to the third input 11, etc.

The precise association between the inputs 9, 10, 11, 12, 13, 14, 15, 16, 17, 18, 19, 20 and the wavelengths of the pump wave which is produced when the respective input 9, 10, 11, 12, 13, 14, 15, 16, 17, 18, 19, 20 is driven is shown in the following Table A:

TABLE A

| Input | Pump wavelength |
| --- | --- |
| 9 | 1420 nm |
| 10 | 1428 nm |
| 11 | 1436 nm |
| 12 | 1444 nm |
| 13 | 1452 nm |
| 14 | 1460 nm |
| 15 | 1468 nm |
| 16 | 1476 nm |
| 17 | 1484 nm |
| 18 | 1492 nm |
| 19 | 1500 nm |
| 20 | 1508 nm |

As is shown in Table A, the wavelengths of the pump waves which can be produced by the Mach-Zehnder interferometer 8 each have a wavelength separation of 8 nm.

The respectively desired input 9, 10, 11, 12, 13, 14, 15, 16, 17, 18, 19, 20 is driven, once again with reference to FIG. 2, by a control device 5a contained in the respective amplification device 5, 6, 7. As is shown in FIG. 3, in the interferometer 8 which is used for a first exemplary embodiment of the present invention, the first, second, third, fifth, seventh, tenth and twelfth inputs 9, 10, 11, 13, 15, 18, 20 are driven, so that, as shown in FIG. 5, pump waves q, r, s, t, u, v, w are produced at seven different pump wavelengths (1420 nm, 1428 nm, 1436 nm, 1452 nm, 1468 nm, 1492 nm and 1508 nm).

Since the Mach-Zehnder interferometer 8 has more inputs 9, 10, 11, 12, 13, 14, 15, 16, 17, 18, 19, 20 than the number of pump waves q, r, s, t, u, v, w to be multiplexed, it is possible to achieve a non-equidistant pump channel pattern overall.

In the present exemplary embodiment, the three pump waves q, r, s, with the shortest wavelength (that is, the pump waves at wavelengths of 1420 nm, 1428 nm and 1436 nm) produced by the Mach-Zehnder interferometer 8 are equidistant from one another. This is because the high local dispersion at relatively short pump wavelengths rapidly results in divergence of the phase relationships and, hence, in reduced four wave mixing.

The wavelengths of the pump waves v, w at the two longest wavelengths (that is, the pump waves at wavelengths of 1492 nm and 1508 nm) are chosen such that a mixed product caused by degenerate four wave mixing from them is at a wavelength which falls in the gap between the longest pump wavelength (in this case, 1508 nm) and the shortest signal wavelength (in this case, 1530 nm).

FIG. 4 shows a schematic illustration of the use of the inputs of a Mach-Zehnder interferometer 8' used in a second exemplary embodiment of the present invention. In this exemplary embodiment, the first, second, third, fifth, sixth, seventh, tenth and twelfth inputs 9', 10', 11', 13', 14', 15', 18', 20' are driven such that pump waves are produced at eight different pump wavelengths (1420 nm, 1428 nm, 1436 nm, 1452 nm, 1460 nm, 1468 nm, 1492 nm and 1508 nm) instead of seven.

The pump waves produced by the Mach-Zehnder interferometer 8' are once again chosen such that the pump waves at relatively short wavelengths (in this case, the pump waves at wavelengths of 1420 nm, 1428 nm, 1436 nm and 1452 nm, 1460 nm, 1468 nm) are equidistant from one another, while the pump waves at longer wavelengths (in this case the pump waves at wavelengths of 1492 nm and 1508 nm) are not equidistant from one another.

The use of Mach-Zehnder interferometers 8 and 8' ensures that relatively high pump powers are injected into the optical waveguide 4. Since the pump waves q, r, s, t, u, v, w have a non-equidistant pump channel pattern, the four wave mixing is furthermore reduced, hence increasing the optical signal-to-noise ratio OSNR.

Although the present invention has been described with reference to specific embodiments, those of skill in the art will recognize that changes may be made thereto without departing from the spirit and scope of the present invention without departing from the hereafter appended claims.

What is claimed is:

1. A method for producing pump waves for Raman amplification of a signal which is passed via an optical waveguide, the method comprising the steps of:
   providing a pump wave producing apparatus having at least one pump source for producing pump waves at a first, a second, a third and a fourth mutually equidistant pump wavelength; and
   driving the pump wave producing apparatus to produce a pump wave at each of the first, second and fourth pump wavelengths, and to produce no pump wave at the third pump wavelength, wherein a non-equidistant pump channel pattern is achieved overall, such that four wave mixing is reduced.

2. A method for producing pump waves for Raman amplification of a signal which is passed via an optical waveguide as claimed in claim 1, wherein the pump wave producing apparatus has a Mach-Zehnder interferometer.

3. A method for producing pump waves for Raman amplification of a signal which is passed via an optical waveguide as claimed in claim 1, the method further comprising the step of driving the pump wave producing apparatus to produce pump waves at a fifth, a sixth and a seventh pump wavelength, which are equidistant from the pump waves at the first, second, third and fourth pump wavelengths, wherein an equidistant pump channel pattern is achieved overall for the pump waves at the fifth, sixth and seventh pump wavelengths, and a non-equidistant pump channel pattern is achieved overall for the pump waves at the first, second and fourth pump wavelengths.

4. A method for producing pump waves for Raman amplification of a signal which is passed via an optical waveguide as claimed in claim 3, wherein the pump waves at the fifth, sixth and seventh pump wavelengths have a shorter wavelength than the pump waves at the first, second and fourth pump wavelengths.

5. A method for producing pump waves for Raman amplification of a signal which is passed via an optical waveguide as claimed in claim 3, wherein the pump waves at the second and fourth pump wavelengths have a longer wavelength than the other pump waves, and a mixed product, which is caused by degenerate four wave mixing of the pump waves at the second and fourth pump wavelengths, is at a wavelength which is shorter than the shortest signal wavelength.

6. A pump wave producing apparatus for producing pump waves for Raman amplification of a signal which is passed via an optical waveguide, comprising:
   at least one pump source for producing pump waves at each of a first, a second, a third and a fourth mutually equidistant pump wavelength; and
   a control device for respectively causing the production of a pump wave at the first, second and fourth pump wavelengths, with no pump wave being produced at the third pump wavelength, wherein a non-equidistant pump channel pattern is achieved overall such that four wave mixing is reduced.

7. A pump wave producing apparatus for producing pump waves for Raman amplification of a signal which is passed via an optical waveguide as claimed in claim 6, wherein pump waves are produced at a fifth, a sixth and a seventh pump wavelength, which are equidistant from the pump waves at the first, second, third and fourth pump wavelengths, and an equidistant pump channel pattern is achieved overall for the pump waves at the fifth, sixth and seventh pump wavelengths, and a non-equidistant pump channel pattern is achieved overall for the pump waves at the first, second and fourth pump wavelengths.

8. A pump wave producing apparatus for producing pump waves for Raman amplification of a signal which is passed via an optical waveguide as claimed in claim 7, wherein the pump waves at the fifth, sixth and seventh pump wavelengths have a shorter wavelength than the pump waves at the first, second and fourth pump wavelengths.

9. A pump wave producing apparatus for producing pump waves for Raman amplification of a signal which is passed via an optical waveguide as claimed in claim 7, wherein the pump waves at the second and fourth pump wavelengths have a longer wavelength than the other pump waves, and a mixed product, which is caused by degenerate four wave mixing of the pump waves at the second and fourth pump wavelengths, is at a wavelength which is shorter than the shortest signal wavelength.

* * * * *